US012599916B2

(12) United States Patent
Heine

(10) Patent No.: US 12,599,916 B2
(45) Date of Patent: Apr. 14, 2026

(54) SHOWER FOR A SANITARY FAUCET

(71) Applicant: Grohe AG, Hemer (DE)

(72) Inventor: Thomas Heine, Herdecke (DE)

(73) Assignee: GROHE AG, Hemer (DE)

(*) Notice: Subject to any disclaimer, the term of this patent is extended or adjusted under 35 U.S.C. 154(b) by 35 days.

(21) Appl. No.: 18/417,271

(22) Filed: Jan. 19, 2024

(65) Prior Publication Data

US 2024/0246096 A1 Jul. 25, 2024

(30) Foreign Application Priority Data

Jan. 20, 2023 (DE) ..................... 10 2023 101 440.4

(51) Int. Cl.
*B05B 1/16* (2006.01)

(52) U.S. Cl.
CPC .................................. *B05B 1/1636* (2013.01)

(58) Field of Classification Search
CPC ....... B05B 1/16; B05B 1/1627; B05B 1/1636; B05B 1/169; B05B 12/002; B05B 1/18; B05B 1/185
See application file for complete search history.

(56) References Cited

U.S. PATENT DOCUMENTS 5,862,985 A * 1/1999 Neibrook .................. B05B 3/04 239/444
2003/0042332 A1 3/2003 Lai
2008/0121293 A1* 5/2008 Leber .................... F16K 11/076 137/597

FOREIGN PATENT DOCUMENTS

DE 20 2005 016 623 4/2006

* cited by examiner

*Primary Examiner* — Steven M Sutherland
(74) *Attorney, Agent, or Firm* — Wenderoth, Lind & Ponack, L.L.P.

(57) ABSTRACT

A shower (1) for a sanitary faucet, comprising:
- a body (2) having at least one inflow duct (3) for a liquid;
- a plurality of spray plates (4.1, 4.2, 4.3); and
- an actuator (5), which can be adjusted along an actuating distance (6) for supplying the liquid to at least one of the spray plates (4.1, 4.2, 4.3), and wherein the actuator (5) has at least one snap position (7.1, 7.2) along the actuating distance (6), in which the liquid can be delivered by at least two spray plates (4.1, 4.2, 4.3).

11 Claims, 3 Drawing Sheets

SHOWER FOR A SANITARY FAUCET

This application claims priority to German Patent Application No. 10 2023 101 440.4, filed Jan. 20, 2023, which is incorporated by reference herein in its entirety.

This invention relates to a shower for a sanitary faucet. Sanitary faucets are used in particular to provide a liquid, such as water, on demand, at a sink, a washbasin, a shower or a bathtub.

Showers for sanitary faucets can, for instance, be designed in the manner of overhead showers and/or hand showers and/or are used to distribute the liquid delivered by the sanitary faucet over a large area. Furthermore, showers, which can be used to deliver a liquid by means of spray plates in different spray patterns, for instance in the form of rain spray, full-body spray, massage spray or pearl spray are known. The spray pattern to be delivered can be selected via actuating elements on the showers, which can be used to control the valves in the liquid supply ducts for the individual spray plates.

There are known showers in which the spray patterns are infinitely adjustable. However, these showers are difficult to adjust, i.e., it is not possible to set the preferred mixing ratios of the spray patterns with repeat accuracy. In addition, the mixing ratio can easily be inadvertently adjusted.

Therefore, the invention addresses the problem of solving at least a part of the issues described with reference to the prior art and, in particular, of providing a shower which permits a mixing ratio of the spray patterns to be set at repeat accuracy.

These problems are solved by a shower according to the features of the independent claim. Further advantageous embodiments of the invention are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A shower for a sanitary faucet having at least the components listed below contributes to solving the problem:

- a body having at least one inflow duct for a liquid;
- a plurality of spray plates; and
- an actuator, which can be adjusted along an actuating distance for supplying the liquid to at least one of the spray plates and wherein the actuator has at least one snap position along the actuating distance, in which the liquid can be delivered by at least two spray plates.

Sanitary faucets are used in particular to supply liquids, such as in particular water, to sinks, washbasins, showers and/or bathtubs as required. For this purpose, cold water at a cold-water temperature and hot water at a hot-water temperature can be supplied to the sanitary faucets, which cold water and hot water can be mixed by the sanitary faucets, for instance by means of a mixing valve or a thermostatic mixing cartridge, to form a mixed water having a desired mixed-water temperature. The cold-water temperature is in particular at most 25° C. (Celsius), preferably 1° C. to 25° C., particularly preferably 5° C. to 20° C. and/or the hot-water temperature is in particular at most 90° C., preferably 25° ° C. to 90° C., particularly preferably 55° C. to 65° C. The mixed water can then be supplied, for instance by means of a liquid line or a liquid hose, to the shower, which may be embodied in the manner of an overhead shower or a hand shower. The shower can be secured to a support, such as a wall, or be moved by a user. The shower can be used to spray liquid using a number of different spray patterns.

The shower has a body having at least one inflow duct for the liquid. The housing can be at least partially made of metal and/or plastic. The liquid can be supplied to the shower via an inlet of the body. The inlet can be connected in particular to the liquid line or the liquid hose of the sanitary faucet. The inflow duct can extend through a handle of the housing. The liquid can be routed to an actuator of the shower via the inflow duct.

The shower has a plurality of spray plates for dispensing the liquid in a plurality of spray patterns, for instance in the form of rain spray, full-body spray, massage spray, hard spray, soft spray or pearl spray. For instance, every spray plate can be used to deliver the liquid in an (individual) spray pattern to an area surrounding the shower. The spray plates can, for instance, be designed like nozzles and/or disposed in the area of a spray head of the shower.

Depending on the desired spray pattern, the actuator can be used to supply the liquid to at least one of the spray plates. For this purpose, a user of the shower can adjust the actuator along an actuating distance to set the spray pattern. The user of the shower can adjust the actuator, for instance using an actuating element. The actuating element can be disposed on the outside of the housing and/or designed as a rotary element or slider. For instance, the actuator can be infinitely adjustable along the actuating distance. The actuator can be positioned along the control path in which the liquid can be supplied through the actuator to (only) one single spray plate and/or the liquid can be delivered in a single spray pattern. These actuating positions can be “non-mixing positions” of the actuator. Between these adjustment positions or non-mixing positions, intermediate positions or mixing positions can be formed along the actuating distance, in which the liquid can be delivered simultaneously via several spray plates, in particular two spray plates, and/or the liquid can be delivered simultaneously in a plurality of spray patterns, in particular in two different spray patterns. By adjusting the actuator, it is possible to switch between the spray patterns, particularly in an infinitely variable manner. This can mean that when the actuator is adjusted, the supply of liquid to one (e.g., first) spray plate can be (continuously) reduced and at the same time the supply of liquid to another (e.g., second) spray plate can be (continuously) increased.

The actuator can be at least partially tubular and/or extend (in particular in parallel to the axis of rotation) from a lower longitudinal end to an upper longitudinal end. The actuator may have a plurality of sections. For instance, the actuator may have a first section having (in particular in parallel to an axis of rotation of the actuator) a first length of, for instance, 5 mm to 25 mm, (in particular orthogonal to the axis of rotation of the actuator) a first outer diameter of, for instance, 10 mm [millimeters] to 80 mm and/or (in particular orthogonal to the axis of rotation of the actuator) a first inner diameter of, for instance, 8 mm to 78 mm. For instance, the actuator can have a second section having (in particular in parallel to the axis of rotation of the actuator) a second length of, for instance, 5 mm to 25 mm, (in particular orthogonal to the axis of rotation of the actuator) a second outer diameter of, for instance, 5 mm to 50 mm and/or (in particular orthogonal to the axis of rotation of the actuator) a second inner diameter of, for instance, 1 mm to 40 mm. The plurality of sections or the first section and the second section can be formed side by side, in particular in parallel to the axis of rotation of the actuator. At least one of the sections, for instance the first section, can have an outer circumferential surface, in particular a smooth one. At least one of the sections, for instance the second section, can have a drive geometry for the actuator, for instance in the form of toothing or a gear wheel.

The actuator has at least one snap position along the actuating distance, in which the liquid can be delivered by at least two spray plates. The at least one snap position is formed in particular in an area of the actuating distance between the actuating positions or non-mixing positions of the actuator, in which the liquid can be supplied by the actuator to (only) one single spray plate and/or the liquid can be delivered by the shower in one single spray pattern. The at least one snap position is formed in particular in an area of the actuating distance, in which the actuator is located in one of the intermediate positions or mixing positions. In the at least one snap position, the liquid can be supplied to two spray plates at a ratio of 25:75, 30:70, 50:50, 70:30 and/or 75:25, for instance. A plurality of snap positions, for instance 2 to 5 snap positions, can be formed between two actuating positions or non-mixing positions of the actuator. The actuator can engage in the at least one snap position. The actuator can be adjusted from the at least one snap position, for instance, using a greater force and/or a greater torque than is required in the other areas of the actuating distance to adjust the actuator. This prevents an inadvertent adjustment of the actuator. When the user of the shower moves the actuator along the actuating distance, reaching the at least one snap position can be perceived, for instance, haptically, acoustically and/or visually. The at least one snap position permits a mixing ratio of at least two spray patterns to be set with repeat accuracy.

The actuator can be rotatable about an axis of rotation. In particular, the actuator can be rotated about the axis of rotation, for instance by 360°, preferably by 90° to 270°, particularly preferably (substantially) by 180°, for adjustment along the actuating distance.

The actuator can have at least one first snap element. The at least one first snap element can, for instance, be formed on the outer circumferential surface of the actuator, for instance in the area of the first section of the actuator. The at least one first snap element can be designed as a snap lug, snap notch or magnet, for instance. The at least one first snap element can be springy and/or spring-mounted, in particular if it is designed as a snap lug.

The actuator may be disposed at least partially in the liquid routing. In particular, the first section of the actuator can be disposed in the liquid routing. Furthermore, the liquid routing can at least partially consist of plastic and/or metal, such as brass. The liquid routing is in particular disposed inside the housing and/or can have a recess for the actuator. The recess can, for instance, be designed as a bearing or a swivel bearing, in which the actuator can be moved or rotated relative to the liquid routing. The recess can have an internal diameter that (substantially) matches an external diameter of the actuator, in particular the first external diameter of the first section of the actuator.

The liquid routing can have a number of liquid ducts through which the liquid can be supplied to the spray plates. For instance, the liquid can be supplied, in particular separately, to each of the spray plates via at least one liquid duct of the liquid routing. The liquid ducts can, for instance, be routed from the recess in the liquid routing to the spray plates.

The liquid routing can have at least one second snap element. The at least one second snap element can, for instance, be formed on an inner circumferential surface of the recess. In the at least one snap position of the actuator, the at least one first snap element and the at least one second snap element can latch together. The at least one second snap element can be designed as a snap lug, snap notch or magnet, for instance. The at least one second snap element can be springy and/or spring-mounted, in particular if it is designed as a snap lug. For instance, the at least one first snap element can be designed as a snap lug and the at least one second snap element as a snap notch (or vice versa). The at least one first snap element and the at least one second snap element can be designed as magnets, which attract each other in the at least one snap position.

The actuator may have an inflow opening for the liquid. In particular, the inflow opening may be formed at the upper longitudinal end of the actuator.

In particular, the inflow opening can be designed to extend in parallel to the axis of rotation of the actuator. In particular, the inflow opening can be coaxial with the axis of rotation of the actuator and/or extend through the second section of the actuator.

The actuator may have an internal chamber for the liquid. In particular, the inner liquid chamber can be formed at least in the first section of the actuator. In particular, the inflow opening can open into the inner liquid chamber.

The actuator may have an outlet opening for the liquid. The outlet opening may, for instance, extend from the inner liquid chamber of the actuator. For instance, the outlet opening can be formed in a circumferential surface of the actuator or a first circumferential surface of the first section of the actuator. The liquid can be delivered via the at least one outlet opening, in particular to the liquid ducts of the liquid routing.

The outlet opening can be formed orthogonally to the axis of rotation of the actuator.

The outlet opening may extend around the axis of rotation of the actuator at an opening angle of 20° to 90°.

The invention and the technical environment are explained in more detail below with reference to the figures. It should be noted that the figures show a particularly preferred embodiment variant of the invention, but the invention is not limited thereto. The same reference numerals are used for the same components in the figures. In an exemplary and schematic manner, FIG. 1 shows a longitudinal section of a shower;

Figure 1:
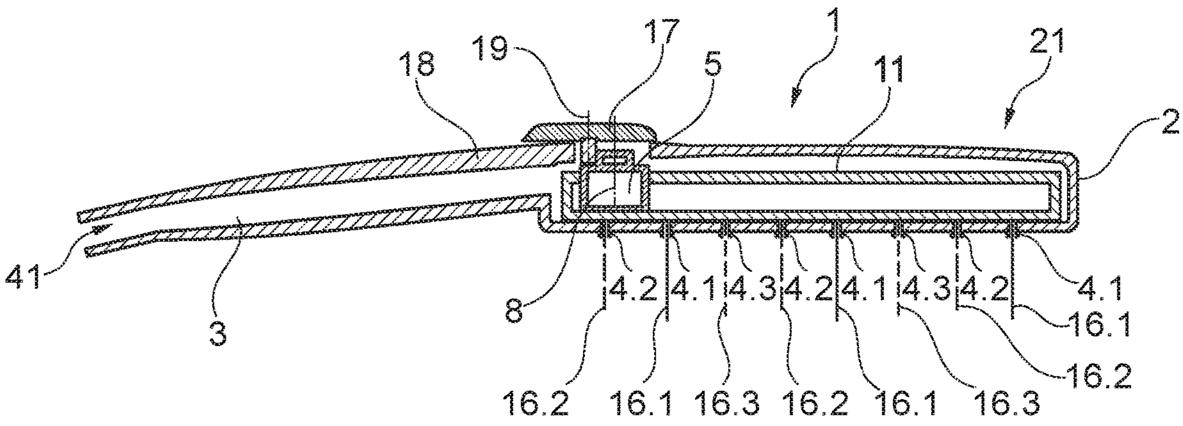

FIG. 1 shows a longitudinal section of a shower 1. The shower 1 has a body 2 having an inflow duct 3. The inflow duct 3 is routed from an inlet 41 of the housing 2 to an actuator 5. For instance, a liquid supply line, not shown here, can be connected to the inlet 41, via which the shower 1 can be connected to a sanitary faucet, also not shown here. The actuator 5 is mounted in a liquid routing 11 of the shower 1 for rotation about an axis of rotation 8. The actuator 5 can be rotated about the axis of rotation 8 via an actuating element 17. The actuating element 17 is disposed on an outside 18 of the housing 2 and can be rotated about an axis of rotation 19 by a user of the shower 1. A rotary movement of the actuating element 17 can be transmitted to the actuator 5 via a toothing 20 shown in FIG. 2. The liquid can flow from the inflow duct 3 through the actuator 5 into the liquid routing 11 and, depending on the rotational position of the actuator 5, can be supplied through the liquid routing 11 to a first spray plate 4.1 for dispensing the liquid in a first spray pattern 16.1, to a second spray plate 4.2 for dispensing the liquid in a second spray pattern 16.2 and/or to a third spray plate 4.3 for dispensing the liquid in a third spray pattern 16.3. The spray plates 4.1, 4.2, 4.3 are disposed on a spray head 21 of the shower 1.

Figure 2:
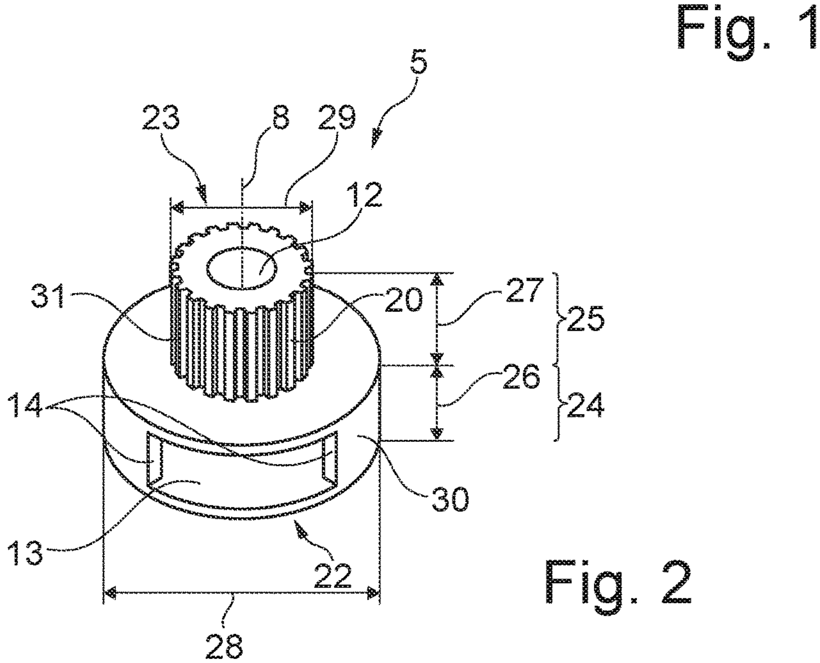
FIG. 2 shows a perspective representation of an actuator of the shower.

FIG. 2 shows a perspective representation of the actuator 5 of the shower 1 of FIG. 1. The actuator 5 extends along the axis of rotation 8 from a lower longitudinal end 22 to an upper longitudinal end 23. The actuator 5 is tubular and has a first section 24 having a first length 26 (in parallel to the axis of rotation 8) and a first outer diameter 28 (orthogonal to the axis of rotation 8) and a second section 25 having a second length 27 (in parallel to the axis of rotation 8) and a second outer diameter 29 (orthogonal to the axis of rotation 8). The actuator 5 has an inflow opening 12 at the upper longitudinal end 23, which inflow opening is coaxial with the axis of rotation 8 and through which the liquid can flow into an inner liquid chamber 13 of the actuator 5. An outlet opening 14 is formed in a first circumferential surface 30 of the first section 24 of the actuator 5. The liquid can flow out of the inner liquid chamber 13 via the outlet opening 14. The toothing 20 is formed on a second circumferential surface 31 of the second section 25. The toothing 20 is oriented in parallel to the axis of rotation 8.

Figure 3:
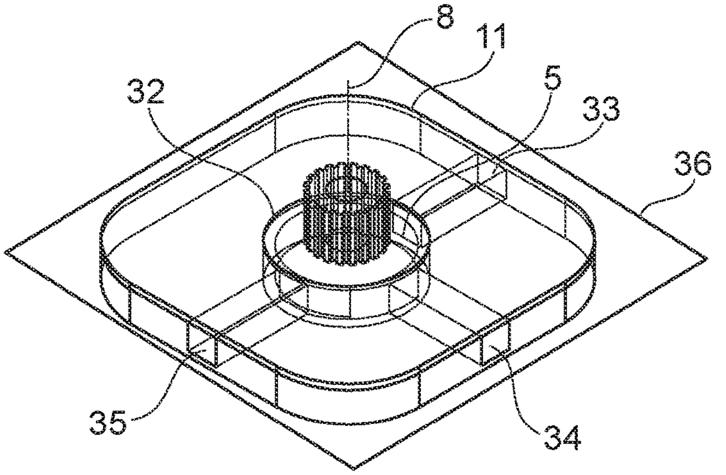
FIG. 3 shows a perspective representation of a liquid routing of the shower including the actuator.

FIG. 3 shows a perspective representation of the liquid routing 11 of the shower 1 shown in FIG. 1 including the actuator 5. The lower longitudinal end 22 of the actuator 5 shown in FIG. 2 or its first section 24 is seated in a cylindrical recess 32 of the liquid routing 11, in which the actuator 5 can be rotated about the axis of rotation 8. The liquid routing 11 has a first liquid duct 33, via which the liquid can be supplied to the first spray plate 4.1 shown in FIG. 1, a second liquid duct 34, via which the liquid can be supplied to the second spray plate 4.2 shown in FIG. 1, and a third liquid duct 35, via which the liquid can be supplied to the third spray plate 4.3 shown in FIG. 1. The first liquid duct 33 and the second liquid duct 34 are offset by 90° about the axis of rotation 8 and the second liquid duct 34 and the third liquid duct 35 are offset by 90° about the axis of rotation 8. The liquid ducts 33, 34, 35 each extend from the recess 32 of the liquid routing 11.

Figure 4:
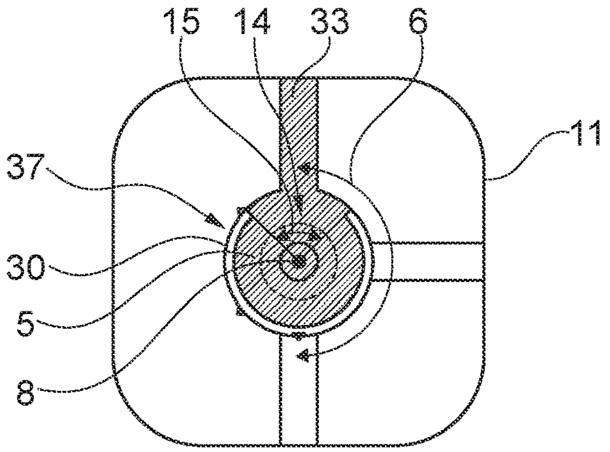
FIG. 4 shows a sectional representation of the liquid routing wherein the actuator is in a first actuating position.

FIG. 4 shows a sectional representation of the liquid routing 11 including the actuator 5 along the sectional plane 36 shown in FIG. 3. The actuator 5 can be adjusted or rotated (here by 180°) about the axis of rotation 8 along an actuating distance 6. In FIG. 4, the actuator 5 is in a first actuating position 37, in which the outlet opening 14 of the actuator 5 is (only) aligned with the first liquid duct 33, i.e., the liquid can only be supplied to the first spray plate 4.1 shown in FIG. 1. The outlet opening 14 extends along the first circumferential surface 30 of the actuator 5 at an opening angle 15 around the axis of rotation 8.

Figure 5:
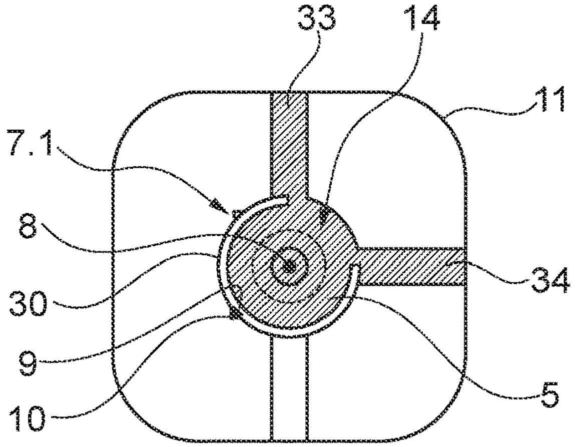
FIG. 5 shows the liquid routing, wherein the actuator is in a first snap position.

FIG. 5 shows the sectional representation of the liquid routing 11 including the actuator 5, wherein the actuator 5 has been adjusted or rotated clockwise into a first snap position 7.1 about the axis of rotation 8. In the first snap position 7.1, the outlet opening 14 of the actuator 5 is (only) aligned with the first liquid duct 33 and the second liquid duct 34, i.e., the liquid can only be supplied to the first spray plate 4.1 and second spray plate 4.2 shown in FIG. 1. In the first snap position 7.1, a first snap element 9 formed on the first circumferential surface 30 of the actuator 5 latches with a second snap element 10 formed on the liquid routing 11. The first snap element 9 is designed here in the form of a nipple and the second snap element 10 in the form of a notch.

Figure 6:
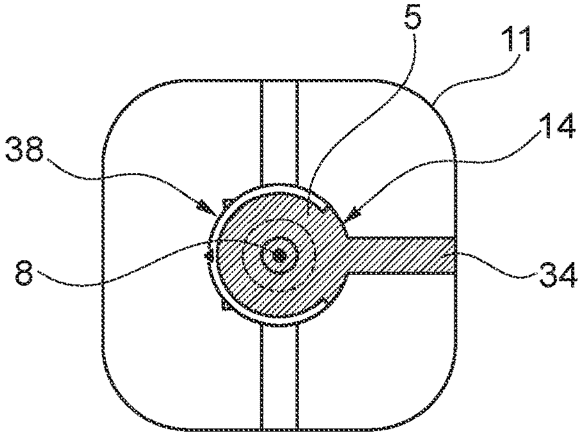
FIG. 6 shows sectional representation of the liquid routing, wherein the actuator is in a second actuating position.

FIG. 6 shows the sectional representation of the liquid routing 11 including the actuator 5, wherein the actuator 5 has been adjusted or rotated clockwise to a second actuating position 38 about the axis of rotation 8. In the second actuating position 38, the outlet opening 14 of the actuator 5 is (only) aligned with the second liquid duct 34, i.e., the liquid can only be supplied to the second spray plate 4.2 shown in FIG. 1.

Figure 7:
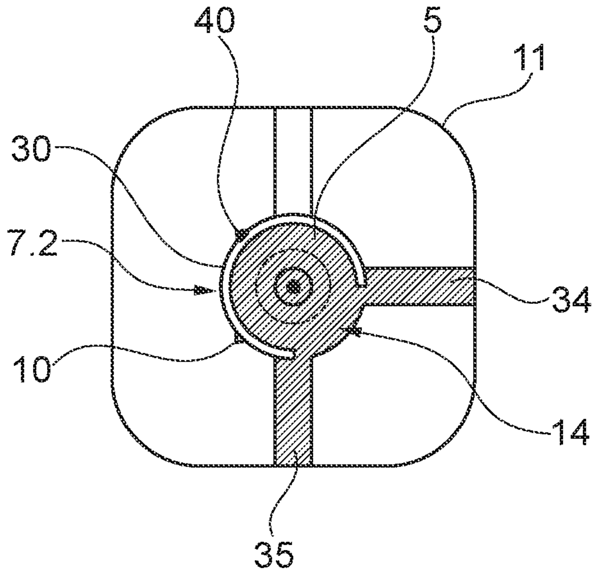
FIG. 7 shows sectional representation of the liquid routing, wherein the actuator is in a second intermediate position.

FIG. 7 shows the sectional representation of the liquid routing 11 including the actuator 5, wherein the actuator 5 has been adjusted or rotated clockwise into a second snap position 7.2 about the axis of rotation 8. In the second snap position 7.2, the outlet opening 14 of the actuator 5 is (only) aligned with the second liquid duct 34 and the third liquid duct 35, i.e., the liquid can only be supplied to the second spray plate 4.2 and third spray plate 4.3 shown in FIG. 1. In the second snap position 7.2, the first snap element 9 formed on the first circumferential surface 30 of the actuator 5 latches with a third snap element 40 formed on the liquid routing 11. Like the second snap element 10, the third snap element 40 is shaped like a notch.

Figure 8:
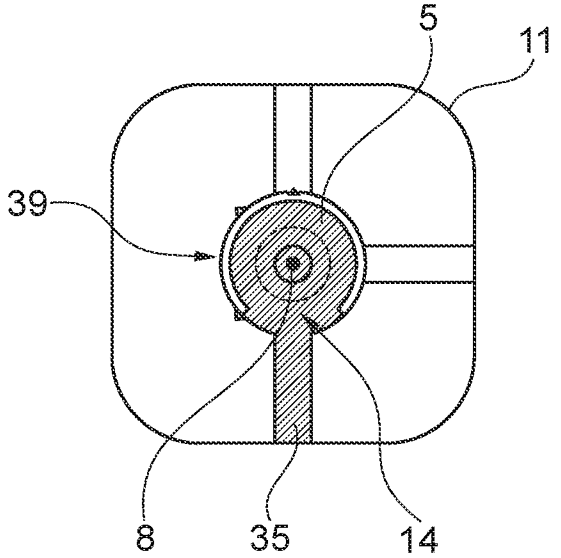
FIG. 8 shows sectional representation of the liquid routing including the actuator in a third actuating position.

FIG. 8 shows the sectional representation of the liquid routing 11 including the actuator 5, wherein the actuator 5 has been adjusted or rotated clockwise to a third actuating position 39 about the axis of rotation 8. In the third actuating position 39, the outlet opening 14 of the actuator 5 is (only) aligned with the third liquid duct 35, i.e., the liquid can only be supplied to the third spray plate 4.3 shown in FIG. 1.

In particular, this invention makes it possible to adjust a mixing ratio of the spray patterns 16.1, 16.2, 16.3 shown in FIG. 1 with repeat accuracy.

LIST OF REFERENCE NUMERALS AND TERMS

1 shower
2 body
3 inflow duct
4.1, 4.2, 4.3 spray plates
5 actuator
6 actuating distance
7.1, 7.2 snap position
8 axis of rotation
9 first snap element
10 second snap element
11 liquid routing
12 inflow opening
13 inner liquid chamber
14 outlet opening
15 opening angle
16.1, 16.2, 16.3 spray pattern
17 actuating element
18 outside
19 axis of rotation
20 toothing
21 spray head
22 lower longitudinal end
23 upper longitudinal end
24 first section

25 second section
26 first length
27 second length
28 first outer diameter
29 second outer diameter
30 first circumferential surface
31 second circumferential surface
32 recess
33 first liquid duct
34 second liquid duct
35 third liquid duct
36 sectional plane
37 first actuating position
38 second actuating position
39 third actuating position
40 third snap element
41 inlet

The invention claimed is:

1. A shower for a sanitary faucet, comprising:
a body comprising at least one inflow duct for a liquid;
a plurality of spray plates;
an actuating element; and
an actuator,
wherein the actuator is adjustable along an actuating distance and rotatable about an axis of rotation to supply the liquid to at least one of the plurality of spray plates, and
wherein the actuator comprises:
at least one snap position along the actuating distance, in which the liquid can be delivered by at least two of the plurality of spray plates,
a toothing around a circumferential surface, the toothing interfaced with the actuating element to transmit a rotary movement, and
an outlet opening for the liquid formed orthogonally to the axis of rotation.

2. The shower according to claim 1, wherein the actuator further comprises at least one snap element.

3. The shower according to claim 1, wherein the shower further comprises a liquid routing, and the actuator is disposed at least in part inside the liquid routing.

4. The shower according to claim 3, wherein the liquid routing comprises at least one snap element.

5. The shower according to claim 1, wherein the actuator further comprises an inflow opening for the liquid.

6. The shower according to claim 5, wherein the inflow opening is formed in parallel to the axis of rotation.

7. The shower according to claim 1, wherein the actuator further comprises an internal chamber for the liquid.

8. The shower according to claim 1, wherein the outlet opening extends around the axis of rotation at an opening angle of 20° to 90°.

9. The shower according to claim 1, wherein the toothing is oriented in parallel to the axis of rotation.

10. The shower according to claim 1, wherein the actuator extends along the axis of rotation from a lower longitudinal end to an upper longitudinal end.

11. The shower according to claim 1, wherein the toothing is oriented perpendicular to the plurality of spray plates.

* * * * *